Figure 1:
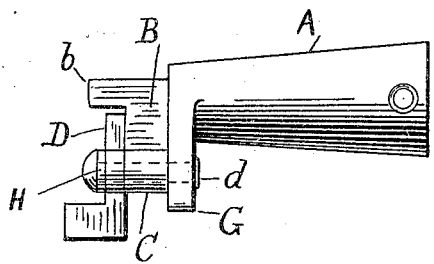

No. 789,261. PATENTED MAY 9, 1905.
J. DAVY.
SWINGLETREE FERRULE.
APPLICATION FILED APR. 14, 1904.

WITNESSES:
J. M. Kalloch
Leon Boillot

INVENTOR:
Joseph Davy
by A. H. Ste Marie
atty

No. 789,261. Patented May 9, 1905.

UNITED STATES PATENT OFFICE.

JOSEPH DAVY, OF OAKLAND, CALIFORNIA.

SWINGLETREE-FERRULE.

SPECIFICATION forming part of Letters Patent No. 789,261, dated May 9, 1905.

Application filed April 14, 1904. Serial No. 203,201.

*To all whom it may concern:*

Be it known that I, JOSEPH DAVY, of Oakland, in the county of Alameda and State of California, have invented certain new and useful Improvements in Swingletree-Ferrules, of which the following is a specification, reference being had therein to the accompanying drawings.

This invention relates to that class of draft-bars which are universally known as "singletrees," (and also called "swingletrees," "whiffletrees," and "whippletrees;") and it consists of an improved attachment at the ends thereof for safely and conveniently connecting the draft-traces thereto and as easily and quickly disconnecting them therefrom, as will be hereinafter fully described.

It is well known that the size and shape of a swingletree varies according to the type and design of the vehicle for which it is made and the amount of strain which it is intended to withstand. For a light vehicle it is customary to have a swingletree with an eye or fixed ring at each end that passes through the eye of the corresponding trace and into which is subsequently passed a small leather tongue to retain the trace in position. This arrangement is unsafe, because the leather tongues oftentimes are overlooked and not inserted in the eyes of the swingletree or pull out or break, so that there is nothing to prevent the traces slipping off the tree ends, and frequent accidents are due to that cause. For heavy work large trees are used, generally circular in cross-section and of a uniform taper from the center toward their ends, the latter being provided each with a ferrule, from which diverges an integral hook for attaching one of the traces. To prevent the trace from becoming unfastened accidentally, the hook is twisted with its point turned uppermost, which requires a similar twisting of the trace and a considerable slack in it to allow its eye to pass over the hook when hitching to the same. The difficulty experienced in harnessing a horse to a vehicle having such swingletree-hooks can be well understood, and this is a disadvantage which is found especially prominent after the animal has fallen down, when it becomes necessary to cut one of the traces in order to obtain slack enough to detach him from the vehicle and allow him to rise, as often occurs upon slippery pavements.

To obviate this difficulty and prevent spoiling an otherwise good trace, to allow fastening and unfastening without twisting either trace or requiring slack therein, and generally to provide a simple safety attachment for the traces on the swingletree that will positively preclude their accidental unfastening or becoming loose and at the same time afford a quick means for connecting or disconnecting them are objects of the present invention.

Figure 2:
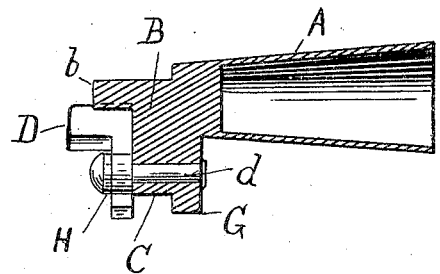
Figure 3:
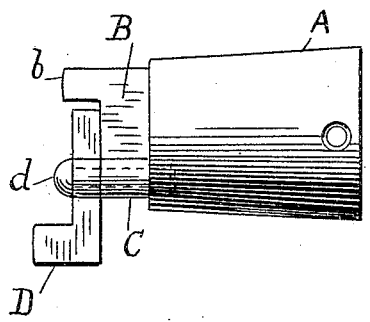
Figure 4:
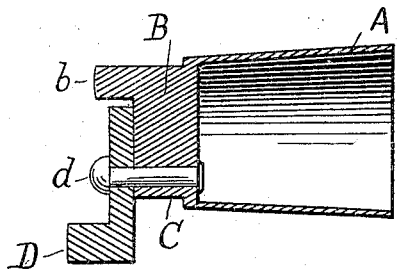
Figures 5, 6:
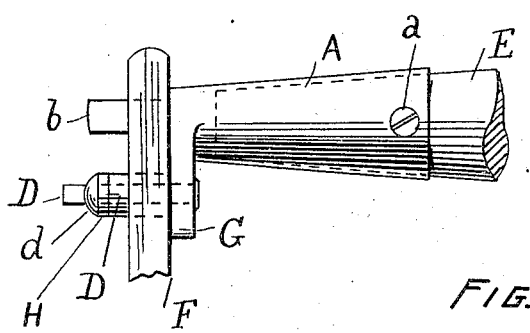
Figure 7:
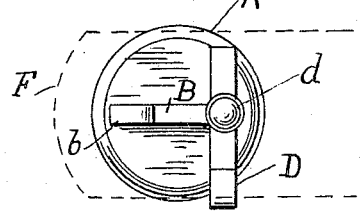

In the accompanying drawings, Figure 1 is a plan view of this improved attachment, showing it with a weighted and pivoted locking-bar thereof in a position to receive the eye of a trace end. The size and design here illustrated are the most suitable for a small swingletree, as that of a buggy or other light vehicle. Fig. 2 is a longitudinal section of the same with an exterior view of the locking-bar and pivot therefor, showing the weighted end of said bar in its greatest rearward position. Fig. 3 is a plan view of the attachment as constructed for a larger swingletree and the heavier trace of a work-harness. Fig. 4 is a longitudinal sectional view of the larger-sized device shown in the preceding figure. Fig. 5 is a plan view of the same size of the device as in Fig. 1 with the end of a trace fastened thereon and showing a portion of the end of a light swingletree to which the attachment is secured. Fig. 6 gives a similar view of the attachment as constructed for heavier work—that is, as in Fig. 3. Fig. 7 is an end view of Fig. 6, the dotted line showing the position of the trace end.

Similar letters of reference designate similar parts throughout the specification and drawings.

The attachment comprises a slightly-tapered sleeve A, having a flat projection B, that extends across its smaller end and projects therefrom a distance about equal to the thickness of a trace, and which projection hereinafter will be called a or the "trace-receiver." This receiver B should correspond in thickness to the eye of a trace or be sufficient to resist the strain to be imposed thereon. An enlargement is made at one end of B to form a boss C, through which is drilled a suitable hole to receive a pin $d$, that forms a pivot for an L-shaped bar D. The latter is not pivoted directly at its center, but a little to one side to allow its base end to be the longer, the object of the L being to weight the bar so that it will always assume a vertical position and hang crosswise the receiver B when the device is in use and, furthermore, provide means for readily turning the same with the fingers. To prevent the cross-bar D from turning entirely around, a stop $b$ is cast upon the said receiver B, which limits the longer or weighted end of the bar and keeps it from turning farther than the position shown in Fig. 2 of the drawings.

To use the device, the sleeve A is fitted to the end of a swingletree, as E, and secured thereon by a screw $a$, with the receiver B standing horizontally or in a line with the draft. To fasten a harness-trace, the L-bar is also turned horizontally, with its weighted end forward, in the line of draft—that is to say, to aline with the receiver B in the position shown in Figs. 1, 3, and 4 of the drawings. Now the eye of a trace, F can be easily slipped over both the bar and the receiver, the protruding stop $b$ serving as a guide for directing its course until it is seated firmly on the receiver and against the shoulder formed by the end of the sleeve, when the bar D can be turned squarely across the trace and made to lock the latter in place by preventing it from slipping off. The weighted end of said bar serves to hold it in this locking position, which no amount of jarring or working of the harness will cause it to change. To unfasten the trace, it is only necessary to repeat the operation of turning the bar D in line with the trace-eye and pull the trace off, it being immaterial whether there is tension upon the trace or not, as the rear edges of the receiver B and stop $b$ thereof are in line and offer no resistance in this outward direction.

The sleeve of the small-sized attachment (for the swingletrees of buggies and the like) is necessarily reduced in diameter, as will be seen by reference to Figs. 1, 2, and 5, except at its outer end, which is extended forwardly in the shape of a wing G, so as to obtain sufficient breadth across the end for a strong and firm trace-receiver, including its stop, and a suitable bearing for the pivot of the L-bar. In this case the pivot $d$ of the bar is riveted on the inside of the wing G instead of inside the sleeve, as shown in Fig. 4.

A washer, as H, is preferably interposed between the head of the pivot $d$ and the adjacent side of the bar D, as shown in Figs. 1, 2, and 5. This washer may, however, be dispensed with, as the other figures of the drawings sufficiently indicate. The washer H will ordinarily be made of metal; but in special cases, where there might be reason to fear that it would become loose enough to rattle and cause an objection on that account, the said washer then could conveniently be made of leather or other non-metallic material placed, as just said, between the bar and pivot-head when the parts are assembled. As the other side of the bar would rest against the leather of the trace when in use, the device would be and remain absolutely noiseless.

What I claim, and desire to secure by Letters Patent of the United States, is—

1. In a trace-holder, the combination with a sleeve, of a horizontally-located trace-receiver extending diametrically across the outer end of the sleeve, the trace-receiver projecting outward from the face of the sleeve, a stop extending in advance of the face of the trace-receiver, the sides of the stop being flush with the sides of the receiver, the stop being of less length than the trace-receiver and located at one end thereof, a latch pivotally secured intermediate its ends to the opposite outer end of the trace-receiver and normally lying in a position transverse to the trace-receiver, the lower end of the latch being weighted.

2. The combination in a trace-holder, with a sleeve, of a trace-receiver, the face of the receiver being cut away to leave a stop at one end thereof, and a latch pivotally secured in the recessed portion of the trace-receiver and movable in a plane parallel with the plane of the face of the sleeve and trace-receiver, the latch adapted to engage the stop.

3. The combination in a trace-holder, of a suitably-supported trace-receiver cut away on its outer face to leave a stop, and a latch pivotally secured to the outer face of the receiver in the cut-away portion thereof, the latch swinging in a vertical plane parallel with the plane of the face of the receiver and abutting against the stop on the face of the receiver.

4. A trace-holder comprising a suitably-supported trace-receiver, the outer face of which is recessed to leave a stop, an apertured enlargement formed in the trace-receiver in its recessed portion and opposite the projection, the enlargement extending transversely of the receiver, a pin-receiver in the aperture in the enlargement, and a latch journaled on the pin and adapted to engage the stop to limit its movement.

5. A trace-holder comprising a suitably-supported trace-receiver, a stop on the face of the receiver extending in advance of and having its sides flush therewith, a pin carried by the receiver and extending in advance thereof and parallel with the stop and a latch journaled on the pin and engaging the stop to limit its movement in one direction.

6. A trace-holder comprising a suitably-supported trace-receiver, a stop extending outwardly from the face thereof, the sides of the stop being flush with the sides of the receiver, and a latch pivoted intermediate its ends to the face of the receiver and moving in a plane parallel with the plane of said face, the distances between the ends of the latch and its pivotal point being unequal, the shorter end of the latch being of less length than the distance between the pivotal point of the latch and the projection to admit of the latch lying parallel with the face of the receiver and in alinement with the stop.

7. A trace-holder comprising a suitably-supported trace-receiver, a stop extending outwardly from the face of the receiver, its sides being flush with the sides of the receiver, a pin secured to and projecting from the face of the receiver, the pin extending parallel with the stop, a latch journaled on the pin and a washer located between the outer face of the latch and the end of the pin.

8. A trace-holder comprising a sleeve, a wing projecting laterally of the sleeve, a trace-receiver secured to and extending parallel with the wing, a stop projecting outward from the face of the receiver and a latch pivotally secured to the face of the receiver and adapted to engage the stop to limit its movement.

In testimony whereof I affix my signature in presence of two witnesses.

JOSEPH DAVY. [L. S.]

Witnesses:
HENRY GRANDJEAN,
A. H. STE. MARIE.